Nov. 19, 1946.     G. H. FRANK     2,411,254
MOLDING DEVICE
Filed Sept. 29, 1942
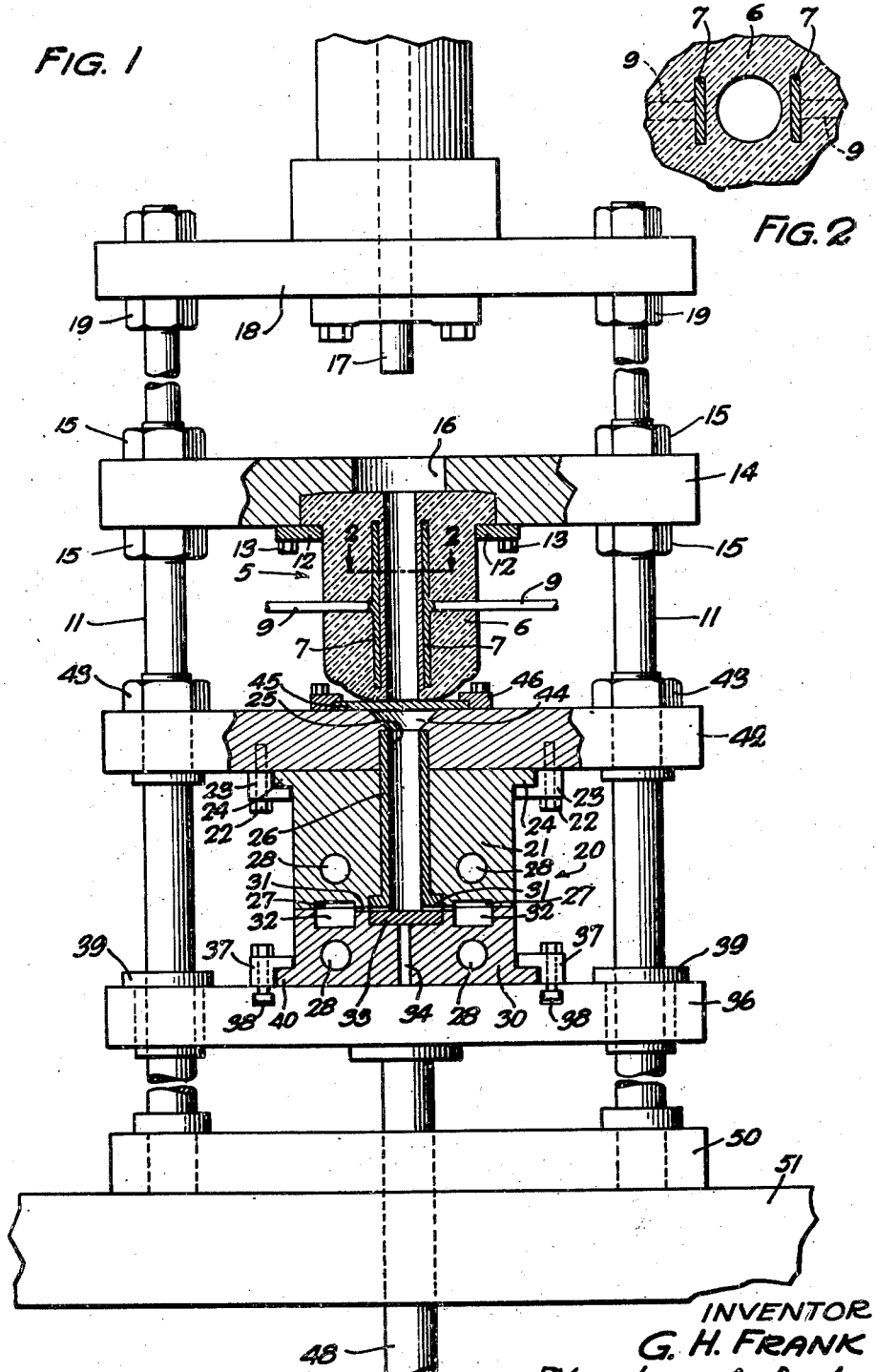
INVENTOR
G. H. FRANK
BY
ATTORNEY Patented Nov. 19, 1946

2,411,254

UNITED STATES PATENT OFFICE 2,411,254

MOLDING DEVICE

George H. Frank, Oak Park, Ill., assignor to Western Electric Company, Incorporated, New York, N. Y., a corporation of New York Application September 29, 1942, Serial No. 460,066

6 Claims. (Cl. 18—30)

1

This invention relates to molding and more particularly to an apparatus for injection molding of thermo-setting materials.

In the manufacture of molded articles from thermo-setting molding compounds, such as certain phenol aldehydes, the molding compound may be preheated prior to injection into the mold. Heat is applied to plastify the compound and render it soft enough to be injectable. Pressure is then applied to inject the compound into the mold. With some phenol aldehyde compounds, the period of heat treatment prior to injection of the compound may be relatively short. For example, with certain phenol formaldehyde compounds, it may be a matter of only a few seconds of heat treatment before the compound will set or cure and become impossible to inject. Thus, the heat treating should preferably be done by a means that permits rapid and uniform preheating and quick transfer of the compound to the molding die when the optimum condition for plastic flow has been attained.

Since the heat is usually transferred to the compound from the walls of the steam or electrically heated container, and since most phenol aldehydes are poor conductors of heat, that portion of the molding compound which contacts the walls of the container is heated more quickly than that portion of the compound in the middle and not contacting the walls of the container. Thus, the portion which contacts the walls of the container may set before the remainder has been plastified. If, however, the compound is transferred to the mold as soon as this outer portion has been properly preheated, the inner portion is likely to be so inadequately plastified that an incompletely cured part may result.

It is an object of the present invention to provide an efficient and effective apparatus for injection molding thermo-setting materials.

In accordance with one embodiment of this invention, a molding apparatus may be provided comprising a molding die having an inlet to admit molding compound. A Pyrex preheater is positioned adjacent this aperture and is provided with a pair of electrodes which are connected to a source of high frequency current. The transformation of high frequency energy into heat in the dielectric molding material causes the material to plastify uniformly and permit quick injection. The dielectric losses in the molding compound produced by the high frequency electrostatic field cause the compound to heat sufficiently for injection. A ram is provided for transferring the plastified molding compound

2 from the preheating chamber to the molding die.

Other objects and advantages of this invention will be apparent from the following detailed description taken in conjunction with the following drawing, wherein:

Fig. 1 is a front elevation, partly in section, of a molding apparatus constructed in accordance with one embodiment of this invention, and Fig. 2 is a fragmentary sectional view along the line 2—2 of Fig. 1.

This invention will be described in connection with the molding of phenol aldehydes. However, it will be understood that the invention is applicable to any plastifiable materials exhibiting an appreciable dielectric loss angle when subjected to a high frequency, high voltage field, such, for example, as rubber and the like.

While most phenol aldehydes are excellent insulating materials for direct current or for low frequency alternating current, they are generally poor insulators for high frequency use, because the power factor of such materials increases with increases in applied frequency. Thus, if a high frequency current of from .1 to 100 megacycles, and of sufficient energy, be applied to such an insulating material, considerable heat will be generated. The percentage of electrical current transformed into heat will be, in general, proportional to the power factor of the insulating material and will increase with increases in frequency. This heat is developed internally within the insulating material and may be regulated precisely by controlling either the strength or the frequency, or both, of the imposed current.

For a given power factor, that material which has the highest dielectric constant will produce the greatest heating effect. In other words, the generation of heat is proportional to the product of the dielectric constant and the power factor. Certain types of Pyrex glass are obtainable which have a power factor of approximately .2 and a dielectric constant of approximately 5 at 18 megacycles, giving a product of 1. Phenol formaldehyde, which is a commonly used phenol aldehyde compound, has a power factor of approximately 6 and a dielectric constant of approximately 5 at 18 megacycles, the product of these being approximately 30. Comparing these products, an energy loss ratio of about 1 to 30 may be seen to obtain between Pyrex and phenol formaldehyde. This indicates that per unit volume of glass and phenol formaldehyde, the transmission of high frequency current through each at the proper energy level would cause the heating of the phenol formaldehyde through a range of 150°

C., while the temperature of the glass would be raised only 5° C. Thus, if a heating chamber be made of this type of Pyrex glass, it becomes possible to heat treat the phenol formaldehyde without substantially increasing the temperature of the heating chamber. Because the heat is generated internally within the phenol formaldehyde resin, the preheating is uniform throughout the charge in the heating chamber.

The present invention contemplates heating the molding compound through the heat generated in the compound by the presence of a high frequency, high voltage electrostatic field. Fig. 1 illustrates an article molding apparatus constructed in accordance with this invention. Essentially, this apparatus comprises a preheater 5 for heating the molding compound prior to transfer of the compound by a ram 17 to a molding die 20. The preheater 5 is formed by a thick walled shell 6 of Pyrex type glass having as low a dielectric constant, loss angle and power factor as feasible in order to keep heating of the preheater during the operation of the apparatus at a minimum. As may be seen in Fig. 2, a pair of electrodes 7 are embedded in the wall of the preheater and oppose each other. It is desirable that these electrodes be made of a conducting material having a temperature coefficient of expansion as near that of the glass used for the heating chamber as possible in order to prevent strain and possible breakage of the glass due to uneven expansion of the two materials during heating.

A properly terminated coaxial cable 9 is connected to each electrode and may, in turn, be connected to a suitable high frequency, high voltage current. With a material such as phenolformaldehyde, it has been found that by employing a current of approximately 2000 volts at a frequency of approximately 18 megacycles, the material will reach molding temperature in a very few seconds. In order to obtain maximum efficiency of the heating apparatus, a current frequency is employed to which the heating apparatus is resonant, the apparatus in effect being a condenser: the electrodes 7 serve as the conducting plates while the molding compound, interposed therebetween, serves as the dielectric body. Once the resonant frequency is determined, adequate control of the heating is had by varying the voltage.

As shown in Fig. 1, the base of the preheater is in a recessed portion of the under-side of a heavy, supporting, cross plate 14 which is supported by four vertical posts 11, two being shown in Fig. 1. A number of bolts 13 and associated clamps 12 serve to hold the heating chamber in place. Holes are provided in each of the corners of the plate 14 through which the posts extend and the plate is fixed in position on the posts by a number of nuts 15 which are threaded to the posts. An aperture 16 is provided in the middle of the plate 14 to permit an operator to place molding compound in the heating chamber. This aperture is made somewhat larger in diameter than the inner diameter of the heating chamber in order to facilitate easy insertion of the molding compound. The four posts together with a base plate 50 form a frame for the whole apparatus. The apparatus may be supported on a table 51.

The lower end of the preheater is tapered and is positioned slightly above a second heavy cross plate 42 which is fixed to the posts 11 by nuts 43. This plate serves as a fixed support for an upper section 21 of the molding die 20. This section 21 is attached to the bottom of the plate 42 by a number of bolts 22 and associated clamps 23, which engage a projecting portion 24 at the base of the section 21. A funnel shaped aperture 44 is formed through the middle of the supporting plate 42 to admit heated molding compound from the heating chamber 5 to the molding die. An aperture 25 extends through the mid-portion of the upper section 21 of the molding die to permit passage of the molding compound to the molding die. A replaceable sleeve 26 of hardened metal is inserted in this aperture and extends into the funnel-shaped aperture 44 of the cross plate 42. By employing a replaceable sleeve of hardened metal, the maintenance cost, due to scoring of the die by the ram, is kept at a minimum.

A relatively thin, removable wedge-shaped plate 45 is positioned on the upper surface of the plate 42 so as to contact the lower end of the preheater 5 and thereby to prevent the molding compound from moving downward out of the heating chamber before the period of heat treatment is complete. A number of guides 46 are attached to the upper surface of the plate 42 in which the plate 45 is slidable, and serve to position the plate 45 properly with respect to the aperture 44.

A lower section 30 of the die 20 is mounted on a vertically movable cross plate 36 which is similar in size and appearance to the supporting plates 42 and 14. This section of the die is attached to the plate 36 by a number of clamps 37 and associated T-bolts 38 which engage the plate 36, the base of the lower section 30 having a projecting portion 40 which is engaged by the clamps 37. The supporting plate 36 has an aperture in each corner and each aperture is provided with a sleeve bearing 39. The posts 11 extend through these sleeve bearings and, thus, serve as guide posts for the plate and lower section of the die as they are raised and lowered by the ram 48.

A pair of feeders 31 are formed in the lower surface of the upper section of the die to permit the molding compound to be injected into mold cavities 27, also formed therein. The lower section is provided with cavities 32 and the mold cavities are shaped in accordance with the shape of the articles to be molded. In operating position, the lower section is held tightly against the upper section by the ram 48 which presses against the base of the plate 36 and raises or lowers it as may be required. When these two sections are in closed or operating position, the cavities of the two sections of the die form a pair of enclosed mold cavities into which the molding compound may be injected by the ram 17. A number of apertures 28 are formed in both sections of the die to permit heating thereof, either by steam or hot air, to complete the curing of the compound.

The high injection pressures required for molding thermosetting materials are such that even the hardest metals may be scored or deformed. Thus, a removable insert 33 of hardened metal is positioned in the upper surface of the lower section of the die to receive the brunt of the pressure exerted by the ram 17 in forcing the molding compound into the mold cavity. This insert may be replaced by inserting a suitable tool in an aperture 34, which extends from the base of the lower section of the base of the insert, and knocking it out. The lower section of the die, of course, must be removed from the plate 36 in order to do this; its removal is facilitated by the use of the T-bolts 38 and clamps 37.

In the operation of this apparatus, a quantity of molding compound to which a small percentage of carbon black may be added to accelerate the heating, may be placed in the preheating chamber. Among other materials that accelerate the rate of heating, zinc sulphide and zinc oxide may also be cited. The presence of moisture in amounts up to 6% also has a definite accelerative effect on the heating. The compound may be previously compacted to form a cylindrical block of substantially the same size as the inside of the heating chamber. Due to heating and the application of pressure, the molding compound will ordinarily be reduced to one-third of its original volume, and by compacting the compound in advance as much as possible, the required size of the heating chamber is kept at a minimum. The ram 17, which is supported by a cross plate 18 fixed to the upper ends of the posts 11 by a number of nuts 19, is then caused to move downward to compact the compound in the heating chamber by actuating a suitable driving means (not shown). A pressure on the order of 150 pounds per square inch may be used in the preheating chamber. Compacting the compound is desirable to obtain maximum efficiency of the electrostatic field applied to the compound by the electrodes.

The ram, being metal, is withdrawn so as not to be in the electrode field and the high frequency current is then applied. When the compound has become sufficiently heated and plastified, the retaining plate 45 is withdrawn and the driving means for the ram 17 is again actuated to force the compound out of the heating chamber, through the funnel-shaped aperture 44 in the plate 42, through the aperture 25 in the upper section of the die 20 and to inject it into the mold cavities. The ram continues its downward movement until the die cavities 27 and 32 have been filled. An injection pressure as great as 30,000 pounds per square inch may be employed in order to force the compound into the mold cavities.

The molded articles are permitted to cure in the mold cavities and then the driving means for the ram 48 is actuated to lower the ram and cross plate 36 so as to separate the two sections of the molding die, thus permitting removal of the molded articles by means such as ejector pins commonly employed in the art. The sections are then brought together again by the ram 48 and the cycle of operation is ready for repetition.

Since for most phenol aldehyde compounds, both the power factor and dielectric constant increase at a much faster rate with increases in temperature than is the case for glass, while the heating of the molding compound may be relatively slow at first application thereto of the high frequency field, the percentage of energy in the circuit transformed into heat will continuously increase at a rapidly accelerated rate as the temperature of the molding compound increases. In short, the higher the temperature of the compound, the greater is the speed of heating. Since this heating characteristic is many times greater for the phenol formaldehyde than for glass, the glass remains relatively cool throughout the operation of the apparatus.

While but one embodiment of the present invention has been shown and described, it will be understood that many changes and modifications may be made therein without departing from the spirit or scope of the present invention.

What is claimed is:

1. A molding apparatus for molding thermosetting material comprising a stationary mold section, a movable mold section cooperating with said stationary mold section to form a mold cavity, means for moving said movable mold section to open and close the mold, means for heating said mold sections, said stationary mold section having an extrusion cylinder for filling said mold cavity, a preheating chamber in alignment with said extrusion cylinder, removable means for closing one end of said chamber means for electrostatically heating molding material in said chamber to a plastic flow condition, and a plunger in alignment with said preheating chamber and said extrusion cylinder for compressing the molding material in said preheating chamber and for transferring the plasticized molding material from said preheating chamber to the extrusion cylinder and then to the mold cavity.

2. A molding apparatus for molding thermosetting material comprising a stationary mold section, a movable mold section cooperating with said stationary mold section to form a mold cavity, means for moving said movable mold section to open and close the mold, said stationary mold section having an extrusion cylinder for filling said mold cavity, means for heating said mold and extrusion cylinder, a preheating chamber in alignment with said extrusion cylinder, means for electrostatically heating molding material in said chamber to a plastic flow condition, and a plunger in alignment with said preheating chamber and said extrusion cylinder for transferring the plasticized molding material from said preheating chamber to the extrusion cylinder and then to the mold cavity.

3. In a molding apparatus for molding thermosetting material, a preheating chamber, a pair of electrodes associated with said chamber, means for supplying current to said electrodes, said electrodes comprising substantially flat plates of conducting material, said plates being spaced from and parallel to each other so as to create a substantially uniform electrostatic field therebetween, a mold chamber having an extrusion cylinder in alignment with said preheating chamber, means for heating said molding chamber and extrusion cylinder, means including a ram in alignment with said preheating chamber and said extrusion cylinder for transferring the plasticized molding compound from said preheating chamber to said extrusion cylinder and then to said mold chamber, and means for retaining molding compound in said preheating chamber during preheating.

4. A molding apparatus for molding thermosetting material comprising a stationary mold section, a movable mold section cooperating with said stationary mold section to form a mold cavity, means for heating said mold sections, means for moving said movable mold section to open and close the mold, said stationary mold section having an extrusion cylinder for filling said mold cavity, a preheating chamber in alignment with said extrusion cylinder, means for electrostatically heating molding material to a plastic flow condition in said chamber, a removable member for retaining the molding material in said chamber, a feeder groove extending laterally from the base of said extrusion cylinder to the mold cavity, said groove being formed in the surface of one of said mold sections, and a means including a plunger in alignment with said preheating chamber for compressing the molding material in said preheating chamber and for transferring molding material from said preheating chamber to the extrusion cylinder and then to the mold cavity.

5. A molding apparatus for molding thermosetting compound comprising a preheating chamber, means for electrostatically heating molding compound in said preheating chamber to a plastic flow condition, means for retaining said molding compound in said preheating chamber until heated, a mold having an extrusion chamber in alignment with said preheating chamber, and a plunger in alignment with said preheating and extrusion chambers for compression the molding compound in the preheating chamber and for transferring the plasticized molding compound from the preheating chamber to the extrusion chamber and then to the mold.

6. A molding apparatus for molding thermosetting material comprising a cylindrical preheating chamber for heating a charge of molding material to a plastic flow condition, said preheating chamber being made of a Pyrex type glass, means for electrostatically heating said molding material in said chamber including a pair of spaced electrodes imbedded in the walls of said chamber, a removable member for closing one end of said chamber, a mold having an extrusion cylinder in alignment with said preheating chamber, means for heating said mold and extrusion cylinder to a temperature to maintain said plastic flow condition, and a plunger in alignment with said preheating chamber and extrusion cylinder for compressing said molding material in said preheating chamber and for transferring the plasticized molding material from the preheating chamber to the extrusion cylinder and then extruding it into the mold.

GEORGE H. FRANK.